3,129,139
THERAPEUTIC COMPOSITION
Lamar B. Dale, Jr., George L. Christenson, and Raymond C. Pogge, Cincinnati, Ohio, assignors to Richardson-Merrell Inc., a corporation of Delaware
No Drawing. Filed Apr. 14, 1958, Ser. No. 728,079
8 Claims. (Cl. 167—68)

Our invention relates to a medicinal composition useful in the treatment of iron deficiency, e.g., hypochromic and microcytic anemia, and to the method of its use.

The administration of iron to iron deficient patients presents a particularly troublesome dosage problem. Only a small percentage of ingested iron is absorbed and this absorption takes place in the upper small intestine. The absorption of iron by the intestinal mucosa is regulated by the iron stores of the body. Although iron deficient subjects can absorb more administered iron than normal subjects, the intestinal barrier is still active and large doses of iron have to be administered to obtain effective responses in hemoglobin increase. A daily dosage of at least about 200 milligrams of elemental iron (e.g., 1.92 grams of ferrous gluconate) is the accepted requirement for adequate hemoglobin response. This amount of iron is required to furnish by absorption about 25 to 30 mg. of iron daily which has been estimated to provide an adequate hemoglobin response. Due to the astringent properties of the iron salts, however, these large doses required in iron therapy are not easily tolerated and often nausea and constipation accompany therapy.

We have found that the combination of ferrous salts useful for iron medication and polyoxyethylene sorbitan monolaurate surprisingly provides a composition providing adequate hemoglobin response with a remarkably small amount of iron, e.g., only 5 to 10 milligram daily of elemental iron (e.g., 43 mg. of ferrous gluconate) as compared to the previous required dosage of 200 milligrams (e.g., 1,920 mg. of ferrous gluconate). It is surprising that an adequate hemoglobin response follows the administration of amounts of iron (5 to 10 mg. per day) heretofore believed to be entirely inadequate. Moreover, undesirable side effects such as gastric irritation or constipation do not accompany the administration of the combination.

The ferrous salts useful in our invention are those useful in iron medication. They include, for example, ferrous gluconate, ferrous sulfate and saccharated ferrous carbonate or mixtures thereof.

The polyoxyethylene sorbitan monolaurate useful in our invention is an oily liquid and is a commercially available material known as Tween-20.

The compositions of our invention contain from about 5 to 10 mg. of elemental iron as ferrous salts in about 200 to 800 mg. of the polyoxyethylene sorbitan monolaurate and in a weight ratio of about 1:40 to 80. In the administration of the compositions, no preconditioning of the gastro-intestinal tract is needed and the dosages range from 5 to 10 mg. of iron as ferrous salts daily.

In clinical tests, a capsule containing 10 mg. of elemental iron as ferrous gluconate in 800 mg. of polyoxyethylene sorbitan monolaurate was administered daily from 4 days to 4 weeks to a group of patients suffering from typical iron deficient anemia and remarkable responses in hemoglobin increase were noted. In one patient, previously refractive to all forms of iron therapy, a 25 percent increase in hemoglobin was noted in slightly less than 4 weeks upon administration of one of the capsules daily. In all the cases, the total amount of iron administered over the test period was considerably smaller than the amount of iron previously believed necessary.

The compositions of our invention can be prepared by mixing the ferrous salt with the liquid polyoxyethylene sorbitan monolaurate in any suitable manner. Preferably, the ferrous salt is reduced to a fine particle size, for example, by micronization, spray drying or ball milling, and the finely divided salt is suspended in the polyoxyethylene sorbitan monolaurate by suitable mixing. The fine particle size does not affect absorption of the salt but provides suspensions satisfactory for encapsulating in soft gelatin capsulates. Minor amounts of other surface active agents, e.g., polyethylene glycol-400, or diluents can be included in the composition. Also, other compatible medicinal ingredients can be included in the composition, if desired, and particularly those used in hematinic compositions including, for example, intrinsic factor, folic acid, ascorbic acid and other vitamins and minerals.

Our invention will be further illustrated by the following examples of dosage unit forms of our compositions.

*Example 1*

Micronized ferrous gluconate, U.S.P., was suspended in polyoxyethylene sorbitan monolaurate by suitable mixing in an amount sufficient to provide 43 mg. of ferrous gluconate (5 mg. of elemental iron) per 200 mg. of the polyoxyethylene sorbitan monolaurate. The mixture was filled into soft gelatin capsules at 243 mg. per capsule.

*Example 2*

Ferrous gluconate, U.S.P. was dissolved in water and spray dried to obtain fine particles. The fine particles were suspended in polyoxyethylene sorbitan monolaurate by suitable mixing in an amount sufficient to provide 86 mg. of ferrous gluconate (10 mg. of elemental iron) per 400 mg. of polyoxyethylene sorbitan monolaurate. The mixture was filled into soft gelatin capsules at 486 mg. per capsule.

*Example 3*

Ferrous gluconate, U.S.P., and polyoxyethylene sorbitan monolaurate, in amounts sufficient to provide 86 mg. of ferrous gluconate (10 mg. of elemental iron) per 800 mg. of polyoxyethylene sorbitan monolaurate, were placed in a suitable container. The container was flooded with nitrogen and the mixture ball-milled for 24 hours. The resulting mixture was filled into soft gelatin capsules at 886 mg. per capsule.

*Example 4*

Micronized ferrous gluconate, U.S.P., was suspended by suitable mixing in polyoxyethylene sorbitan monolaurate and polyethylene glycol 400 in amounts sufficient to provide 86 mg. of ferrous gluconate (10 mg. of elemental iron) per 400 mg. of polyoxyethylene sorbitan monolaurate and 50 mg. of polyethylene glycol 400. The mixture was filled into soft gelatin capsules at 536 mg. per capsule.

*Example 5*

By replacing ferrous gluconate of Examples 1 to 4 with ferrous sulfate or saccharated ferrous carbonate in the proper amounts to provide 5 or 10 mg. of elemental iron similar compositions are obtained containing ferrous sulfate or saccharated ferrous carbonate in polyoxyethylene sorbitan monolaurate. The amounts to be used are:

Ferrous sulfate:
    25 mg.=5 mg. elemental iron
    50 mg.=10 mg. elemental iron Saccharated ferrous carbonate:
    25.8 mg.=5 mg. elemental iron
    51.6 mg.=10 mg. elemental iron

We claim:
1. A medicinal composition containing a ferrous salt useful for iron medication in an amount sufficient to provide about 5 to 10 milligrams of elemental iron and about 200 to 800 milligrams of polyoxyethylene sorbitan monolaurate, and in a weight ratio of about 1 part of elemental iron to about 40 to 80 parts of the polyoxyethylene sorbitan monolaurate.

2. The composition of claim 1 in which the ferrous salt is ferrous gluconate.

3. The composition of claim 1 in which the ferrous salt is ferrous sulfate.

4. The composition of claim 1 in which the ferrous salt is saccharated ferrous carbonate.

5. A method for treating iron deficiency in patients which comprises administering to the patient a medicinal composition containing a ferrous salt useful for iron medication in an amount sufficient to provide about 5 to 10 milligrams of elemental iron, and about 200 to 800 milligrams of polyoxyethylene sorbitan monolaurate, and in a weight ratio of about 1 part of elemental iron to about 40 to 80 parts of polyoxyethylene sorbitan monolaurate.

6. The method of claim 5 in which the ferrous salt is ferrous gluconate.

7. The method of claim 5 in which the ferrous salt is ferrous sulfate.

8. The method of claim 5 in which the ferrous salt is saccharated ferrous carbonate.

References Cited in the file of this patent

UNITED STATES PATENTS 2,851,394    Vaughan _____ Sept. 9, 1958

OTHER REFERENCES

Ind. and Eng. Chem., 35:1, pp. 126–130, January 1943.

Stoklosa et al.: J. A. Ph. A. (Prac. Pharm. Ed.), 12:1, pp. 23–25, January 1951.